United States Patent
Agarwal et al.

(10) Patent No.: US 9,350,815 B2
(45) Date of Patent: May 24, 2016

(54) SYSTEM AND METHOD FOR SUPPORTING MULTICAST DOMAIN NAME SYSTEM DEVICE AND SERVICE CLASSIFICATION

(75) Inventors: Gopal Agarwal, Bangalore (IN); Anupam Wadhawan, Bangalore (IN); Partha Narasimhan, Saratoga, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 192 days.

(21) Appl. No.: 13/542,606

(22) Filed: Jul. 5, 2012

(65) Prior Publication Data
US 2014/0012967 A1  Jan. 9, 2014

(51) Int. Cl.
*G06F 15/173* (2006.01)
*H04L 29/08* (2006.01)
*H04L 29/12* (2006.01)

(52) U.S. Cl.
CPC ............ *H04L 67/16* (2013.01); *H04L 61/1511* (2013.01); *H04L 61/6013* (2013.01)

(58) Field of Classification Search
CPC ..... H04L 67/16; H04L 12/4633; H04L 67/18; H04L 61/00
USPC .................................. 709/223, 224, 226, 229
See application file for complete search history.

(56) References Cited

U.S. PATENT DOCUMENTS

| | | | |
|---|---|---|---|
| 7,656,822 B1 * | 2/2010 | AbdelAziz et al. | 370/255 |
| 2009/0092111 A1 * | 4/2009 | Horn et al. | 370/338 |

* cited by examiner

*Primary Examiner* — Yves Dalencourt
(74) *Attorney, Agent, or Firm* — Hewlett Packard Enterprise Patent Department (57) ABSTRACT

According to one embodiment, a digital device is adapted to support one or more network services. The digital device comprises processing circuitry, and a memory coupled to the processing circuitry. The memory comprises logic that, when executed by the processing circuit, is configured to (i) detect, in response to a triggering event, one or more network services advertised by at least one digital device within a network, and (ii) store information only directed to the one or more network services.

23 Claims, 7 Drawing Sheets

SYSTEM AND METHOD FOR SUPPORTING MULTICAST DOMAIN NAME SYSTEM DEVICE AND SERVICE CLASSIFICATION

FIELD

Embodiments of the present disclosure relate to the field of network communications, and in particular, a system and method for supporting multicast domain name system (mDNS) message exchanges across different subnetworks and/or different virtual local area networks (VLANs).

BACKGROUND

A Domain Name System is a hierarchical distributed naming system that is utilized by network devices to locate services or other network devices through the use of a domain name. As commonly known, a "domain name" is an alphanumeric string that represents an Internet Protocol (IP) resource such as a server hosting a web site for example. An important function of domain names is to provide users with an easily recognizable and memorable name for the IP resource instead of using a forgettable numeric-based address.

Domain names are usually organized into various sub-domain levels, including a top-level domain (e.g. com, org, net) along with a second-level domain being the wording directly to the left of the top-level domain name. For instance, "example.com" features the second-level domain "example" separated from the top-level domain "com" by a delimiter ".".

Typically, a Domain Name System (DNS) features a centralized DNS server that is adapted to translate a received domain name into a corresponding IP address. Furthermore, the DNS server is responsible for storing DNS records for a domain name (e.g. address records, name server (NS) records, and mail exchanger (MX) records) within an internal database and answering queries against the database. Therefore, the addressing information is used for the purpose of locating services as well as other network devices.

Over a decade ago, a derivative DNS scheme was developed. Referred to as Multicast Domain Name System (mDNS), this communication protocol enables the use of DNS programming interfaces and packet formats, but operates without the need for a dedicated DNS server. The conventional mDNS protocol is devised to operate for mDNS devices on a shared local area network, wherein all devices talk to each other directly using a specified mDNS multicast group address. This conventional functionality is limited to a single subnet, where all mDNS capable devices can communicate directly with each other only within a subnet.

Currently, mDNS fails to provide any device classifications. Therefore, as the mDNS proxy supports multicast mDNS packets across subnet boundaries, the large number of mDNS records for storage and maintenance would become a memory and processing bottleneck. An improved mechanism for managing mDNS records through device and service classification is needed.

BRIEF DESCRIPTION OF THE DRAWINGS

Embodiments of the present disclosure are illustrated by way of example, and not by way of limitation, in the figures of the accompanying drawings and in which.

DETAILED DESCRIPTION

In the following description, several specific details are presented to provide a thorough understanding of the invention. While the context of the disclosure is directed to a scheme for supporting mDNS-type (multicast Domain Name System) communications within a network extending across network boundaries, one skilled in the relevant art may recognize, however, that the concepts and techniques disclosed herein can be practiced without certain details such as the exclusion of one or more operations, logic unit(s), or the like.

Herein, certain terminology is used to describe features for embodiments of the disclosure. For example, the term "digital device" generally refers to any hardware device that includes a processor. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral such as Apple® TV, a printer, a mobile handset, a smartphone, a personal digital assistant "PDA", a wireless receiver and/or transmitter, an access point, a base station, a communication management device, a router, a switch, and/or a controller.

An "access point" is a digital device which may be communicatively coupled to one or more networks (e.g., Internet, an intranet, etc.). The access point, also referred to as "AP," communicates with a wired network and client devices over an interconnect.

A "controller" is a combination of hardware, software, and/or firmware that is configured to process and route information between digital devices within a network. In an example, a controller receives information from digital devices within a network and forwards the information to a target access point. In another example, the controller receives information from an access point and forwards the information to digital devices within a network. A controller may support an access point by one or more of: handling network security, enforcing policies, managing authentication, encryption, virtual private network (VPN) connections, IPv4 and IPv6 Layer 3 networking, a Policy Enforcement Firewall (PEF), Adaptive Radio Management (ARM), Spectrum Analysis, admission control, Quality of Service (QoS), and Wireless Intrusion Protection capabilities.

When a digital device is adapted for communications with a network in accordance with multicast Domain Name System (mDNS) protocol, the digital device, referred to as "mDNS device", may be configured as a server, a client, or both. A "server mDNS device" is a digital device that may be configured to provide a network service. A "client mDNS device" is a digital device that may be configured to receive a network service.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the term "logic" (or "logic unit") is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission media (e.g., electrical, optical, acoustical or other form of propagated signals such as carrier waves, infrared signals, or digital signals).

The term "interconnect" is a communication path between two or more digital devices. The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "message" is a grouping of information, which may be placed in the form of a packet, a stream (e.g., a sequence of packets), a frame, an Asynchronous Transfer Mode (ATM) cell, or any other series of bits having a prescribed format. An example of a type of message is an "mDNS message" having a format in compliance with the mDNS protocol or a protocol based at least in part on the mDNS protocol.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. Well-known logic and operations may not be set forth in detail in order to avoid unnecessarily obscuring this description. Moreover, the illustrated embodiments of the disclosure, and the description associated therewith, should be considered as examples of the principles of the invention and not intended to limit the disclosure to those specific embodiments. It should be understood that this disclosure covers all modifications, equivalents, and alternatives falling within the spirit and scope of the present disclosure.

Overview

According to one embodiment of the disclosure, mDNS proxy logic may be adapted to process records based on a service name. The service name is part of the mDNS Pointer (PTR) record, and happens to be the first record, in the list of records advertised by an mDNS device, for a given service. The mDNS proxy logic may be adapted to record a Media Access Control (MAC) address of a first PTR record for a given service. This would thus identify the "server device" for a service.

The mDNS proxy logic classifies records to be associated with a server device, based on server's MAC address. Once the server's MAC address is known, records only from that server are cached by the mDNS proxy logic. All other records are discarded by the mDNS proxy logic.

A second level of memory and processing optimization is done, by further classifying all records received from a server mDNS device. The mDNS proxy logic will discard records received from a server mDNS device that are not directed to a requested service as some server mDNS devices may support multiple services.

The third level of classification is done when the mDNS proxy logic is adapted to store specific records from a server mDNS device. According to one embodiment of the disclosure, the record storage is directed to those records that are needed by an intended user to successfully use the advertised service.

Accordingly, the mDNS proxy logic may support 1000 server mDNS devices and 10,000 client mDNS devices, while consuming only few megabytes (MB) of memory (<10 MB, ~4 MB), in a full scale deployment scenario.

General Network Architecture

Figure 1:
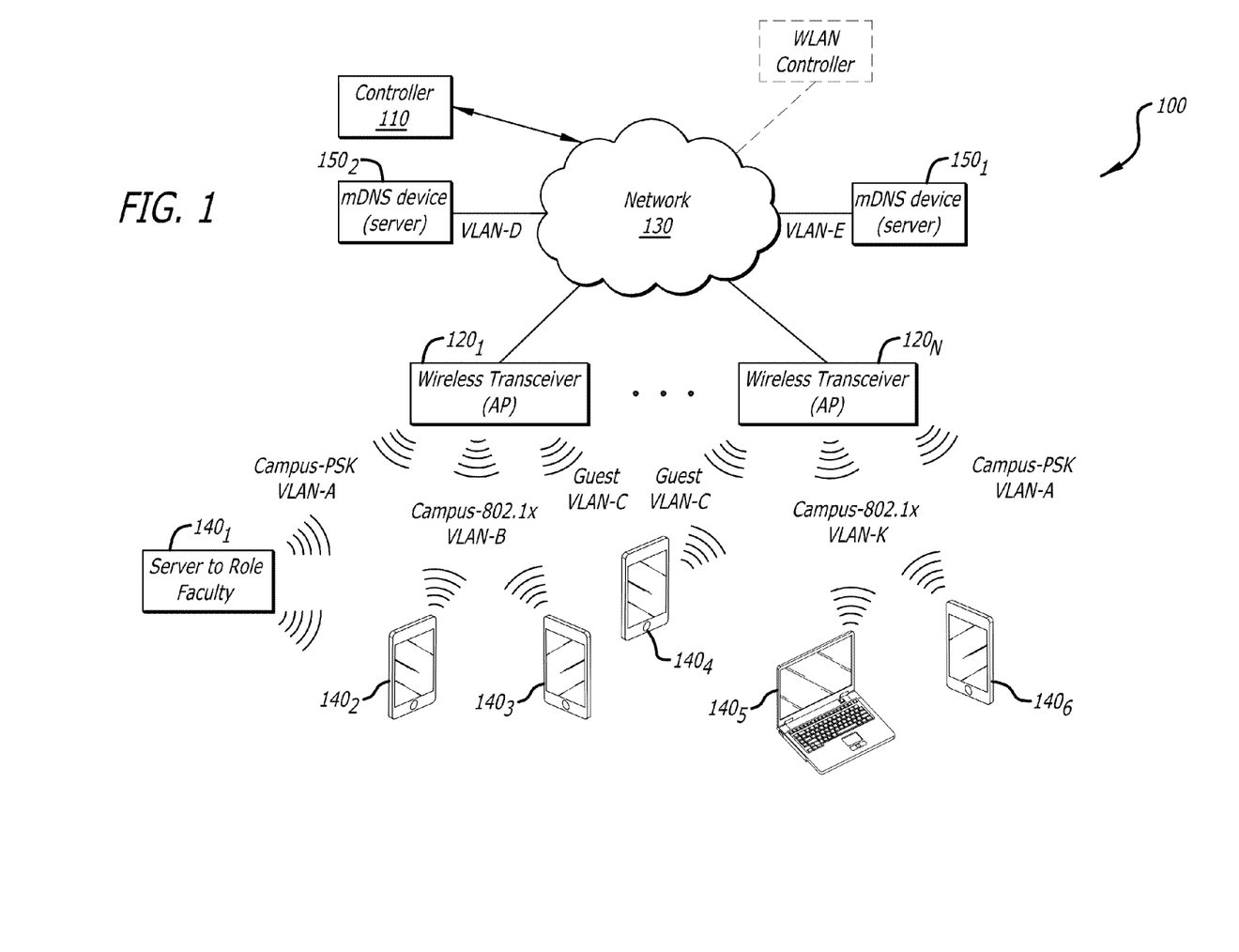
FIG. 1 is a general block diagram of a first embodiment of a network operating in accordance with enhanced mDNS protocol.

Referring to FIG. 1, a general block diagram of an extended local area network 100 operating in accordance with a communication protocol that is based on multicast Domain Name System (mDNS) is shown. This communication protocol, referred to herein as an "enhanced mDNS protocol," supports conventional mDNS protocol and/or additional capabilities such as device classification, an optimized record handling, and/or unicast response messaging as described below.

Herein, network 100 comprises a controller 110 in communications with one or more wireless transceivers $120_1$-$120_N$ (N≥1) over a wired network 130. Wireless transceivers $120_1$-$120_N$ (e.g. access points, etc.) are adapted to provide wireless connectivity to a plurality (M) of mDNS devices $140_1$-$140_6$ (M≥2, M=6), which may be members of the same virtual local area network (VLAN-A) or perhaps different VLANs (VLAN-A, VLAN-B, VLAN-C). As further shown in FIG. 1, controller 110 may be adapted for communications with a first mDNS device (e.g., networked printer) $150_1$ and/or a second mDNS device $150_2$ (e.g., Apple® TV), both of which are directly coupled to wired network 130 and are members of different VLANs (VLAN-D & VLAN-E).

In accordance with the enhanced mDNS protocol, all mDNS messages terminate on controller 110. In other words, controller 110 operates as an enhanced mDNS proxy for mDNS devices $140_1$-$140_M$ and $150_1$-$150_2$, and thus, is configured to receive all mDNS messages transmitted over network 100 from a source mDNS device. These mDNS messages may include, but are not limited or restricted to (i) mDNS Response messages that are adapted to advertise records identifying one or more services offered by a particular mDNS device, and (ii) mDNS Request messages that are adapted to request one or more services identified in that message.

Based on the type of mDNS message received from a source mDNS device, controller 110 is configured to classify that device as either a "server" mDNS device or a "client" mDNS device. For instance, upon determining that mDNS device 150$_1$ is advertising records related to one or more services, controller 110 may classify this source mDNS device 150$_1$ as a server mDNS device. Similarly, upon determining that mDNS device 140$_2$ is interested in consuming the services provided by one or more server mDNS devices, controller 110 may classify mDNS device 140$_2$ as a client mDNS device.

According to one embodiment of the disclosure, it is contemplated that controller 110 performs device classification at least partially based on (i) whether any services are being advertised by the source mDNS device and (ii) what type of services (if any) are being advertised. For instance, as an illustrative example, controller 110 may classify an mDNS device as a "server" mDNS device upon receipt of an mDNS Response message accompanied by a record directed to a service (e.g., AirPlay) configured to be supported by controller 110. Similarly, controller 110 may classify an mDNS device as a "client" mDNS device upon receipt of an mDNS Request message requesting a service or receipt of an mDNS Response message accompanied by a record directed to a service (e.g., AirPrint) that is not configured as being supported by controller 110.

It is noted that these device classes are not mutually exclusive as the source mDNS device may operate in one or both of these classes. For instance, mDNS device 140$_1$ could operate as a user by requesting particular services but may advertise a different service.

Figure 2:
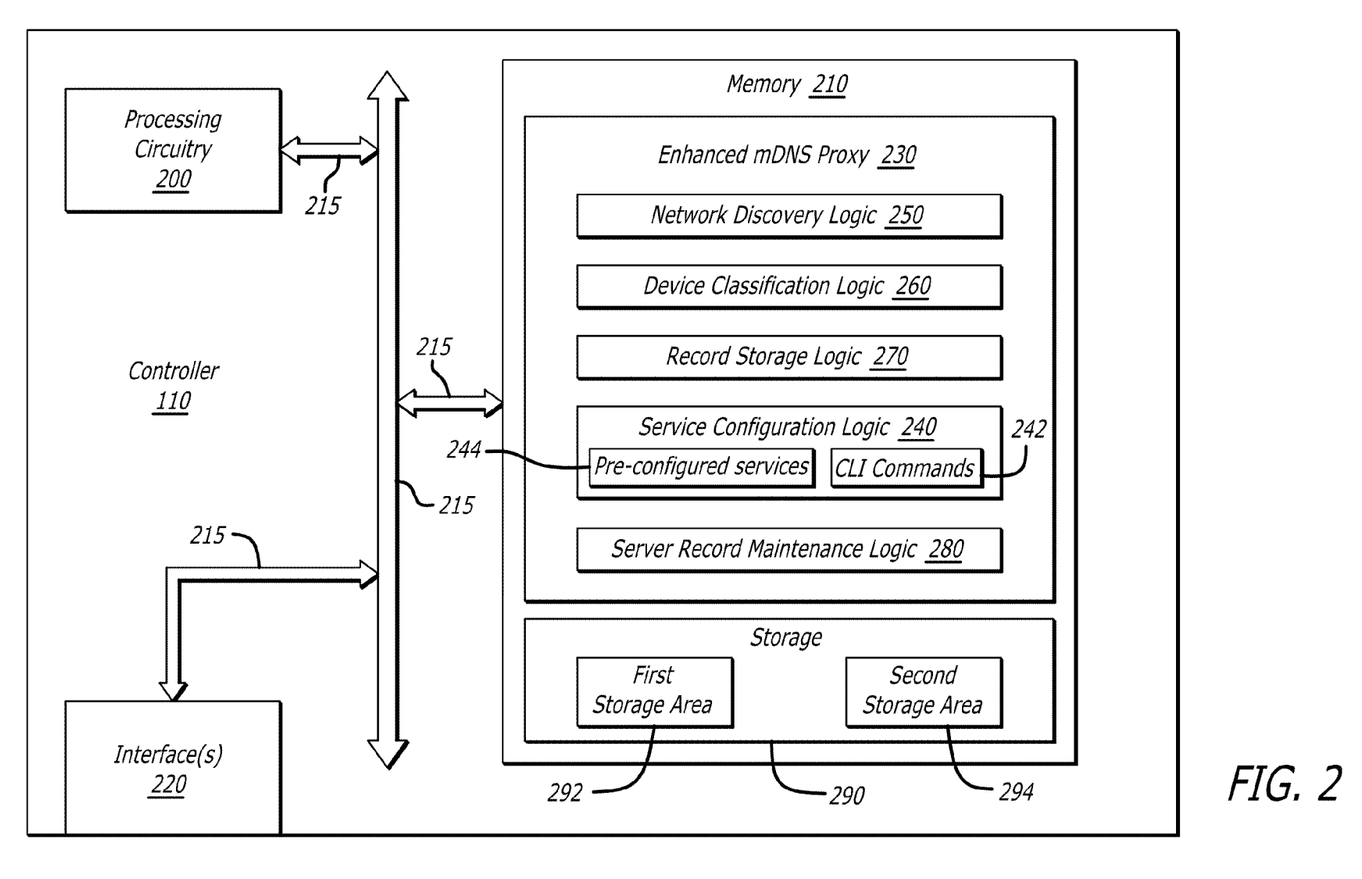
FIG. 2 is an exemplary block diagram of a controller operating as an mDNS proxy for the network of FIG. 1.

Referring now to FIG. 2, an exemplary block diagram of controller 110 operating as an enhanced mDNS proxy for network 100 of FIG. 1 is shown. Herein, controller 110 comprises processing circuitry 200 and memory 210, which are coupled via interconnects 215 to one or more interfaces 220 that enable controller 110 to communicate with other networking devices. For instance, interface 220 may be implemented as a physical interface including one or more ports for wired connectors. Additionally, or in the alternative, interface 220 may be implemented with one or more antenna units for transmitting and/or receiving wireless signals from other networking devices.

As shown in FIG. 2, according to one embodiment of the disclosure, processing circuitry 200 is coupled to memory 210 for execution of enhanced mDNS proxy logic 230 which is stored in memory 210. Enhanced mDNS proxy logic 230 comprises a plurality of logic units configured to perform device classification and optimal mDNS record storage operations in accordance with the enhanced mDNS protocol as described below. These logic units include, but are not limited or restricted to service configuration logic 240, network discovery logic 250, device classification logic 260, record storage logic 270, and server record maintenance logic 280.

Service configuration logic 240 is adapted to enable an administrator to control which services are supported by controller 110. Such control may be conducted through command-line interface (CLI) commands 242 for example. For instance, according to one embodiment of the invention, CLI commands may be used to enable/disable enhanced mDNS proxy logic 230 (see CLI command (1) below) as well as to enable/disable different enhanced mDNS proxy services as shown in CLI commands (2) where a first type of service is enabled while a second service type is disabled.

```
Enhanced_mDNS_proxy     enable                    (1)
Enhanced_mDNS_proxy_service "airplay"
    id "_airplay._tcp"
    description "AirPlay"
Enhanced_mDNS_proxy_service "airprint"
    id "_ipp._tcp"
    id "_pdl-datastream._tcp"
    description "AirPrint"
Enhanced_mDNS_proxy service   AirPlay    enable    (2)
Enhanced_mDNS_proxy service   AirPrint   disable
```

Additionally, certain enhanced mDNS proxy services 244 may be pre-configured and made available as a part of a factory default configuration. Examples of these pre-configured services may include AirPlay and AirPrint services.

The AirPlay service is a protocol that allows for wireless streaming of audio and/or video content between two mDNS devices. One type of mDNS device, Apple® TV, provides AirPlay services that will enable a user to seamlessly discover Apple-TVs, and do mirroring of audio and video content. As identified above, AirPlay service may have the following factory default service-ids: _airplay.tcp.

The AirPrint service is a protocol that enables printing of data sent over a wireless interconnect to specific printers without previous installation of printer-specific drivers. The AirPrint service may have a number of factory default service-ids, including "_ipp._tcp" and "_pdl-datastream._tcp" as shown above.

Referring still to FIG. 2, the conventional mDNS protocol is devised to operate for mDNS devices on a shared local area network, wherein all devices talk to each other directly using a specified mDNS multicast group address. In contrast, the enhanced mDNS protocol introduces the concept of a proxy, namely enhanced mDNS proxy logic 230, which is responsible for disseminating the required filtered mDNS records to requesting client mDNS devices. This additional concept now formulates a set of requirements, where network discovery is one of these requirements.

Unlike the conventional mDNS protocol, the enhanced mDNS protocol supports communications across networks, including but not limited or restricted to subnets and/or VLANs, without any reconfiguration of local area network 100 of FIG. 1. In an attempt to mitigate mDNS multicast traffic that will increase as wireless connectivity demands grow, the enhanced mDNS protocol relies on unicast messaging except for a few noted exceptions. According to one embodiment, the unicast message is an Open System Interconnect (OSI) Layer 2 (L2) unicast message containing the embedded L3 multicast packet, without any modifications. A header of the L2 unicast message would contain the Media Access Control (MAC) address for the destination mDNS device instead of the mDNS multicast MAC address.

While controller 110 normally relies on unicast messaging in providing service records to client mDNS devices, it is contemplated that, in response to certain events, discovery network processes are conducted by network discovery logic 250 to learn the network topology. According to one embodiment of this disclosure, these events may include, but are not limited or restricted to the following: (1) discover network topology when enhanced mDNS proxy logic 230 is initialized; (2) discover network topology when enhanced mDNS proxy logic 230 on controller 110 is restarted; (3) discover VLAN topology when a VLAN is configured; (4) discover network topology when a new enhanced mDNS service is configured; and/or (5) discover server records when a new enhanced mDNS server is added to the network.

When initialized on controller 110, enhanced mDNS proxy logic 230 needs to learn the network topology as to which mDNS devices across different VLANs are advertising services and what records are being maintained by these server mDNS devices. As a result, network discovery logic 250 is controlled to send out Query messages for each VLAN interface. These messages force the server mDNS devices on the network to respond with their latest status, which is stored by enhanced mDNS proxy logic 230 for use in responding to subsequent Request messages from client mDNS devices. Network discovery logic 250 uses a multicast Query message for initial network discovery.

Enhanced mDNS proxy logic 230 is adapted to receive VLAN operation state change information. As a result, when a new VLAN is configured on controller 110, network discovery logic 250 performs a network discovery for this VLAN. More specifically, network discovery logic 250 sends out a multicast Query message, to learn about all server mDNS devices on this particular VLAN. The Query message forces the server mDNS devices on this VLAN to respond with their latest status, which is stored by enhanced mDNS proxy logic 230 for use in responding to subsequent Request messages from client mDNS devices deployed across VLANs. This assists enhanced mDNS proxy logic 230 to be synchronous with server mDNS devices on a newly configured VLAN.

The enhanced mDNS protocol optimizes record storage through a matching and coordination of enhanced mDNS services. In other words, enhanced mDNS proxy logic 230 considers only those server mDNS devices which advertise records pertaining to configured services. As a result, when a new enhanced mDNS service is configured to be supported by controller 110, network discovery logic 250 attempts to discover all server mDNS devices, across all VLANs, which are relevant in the context of this service. Network discovery logic 250 may be adapted to use a multicast Query packet, to be sent out for each VLAN.

Network discovery logic 250 receives information that indicates authentication of a new mDNS device. In response, network discovery logic 250 sends a unicast Query packet to this new mDNS device to obtain information associated with the new mDNS device. If the mDNS device is classified as a server mDNS device, network discovery logic 250 obtains only those mDNS records directed to service(s) supported by enhanced mDNS proxy logic 230. If the mDNS device is classified as a client mDNS device, network discovery logic 250 stores at least the MAC and VLAN information for client mDNS device within a second storage area 294 of storage 290.

Referring still to FIG. 2, device classification logic 260 is adapted to detect, from messages received from mDNS device, whether the source mDNS device should be classified as a "server" mDNS device or a "client" mDNS device. According to one embodiment of the disclosure, an mDNS device is classified as a "server" upon receipt of an mDNS message including a record directed to a service supported by controller 110. The classification of the mDNS device as a server is important as this classification enables all subsequent mDNS records from this server mDNS device to be stored by device classification logic 260 within first storage area 292 of storage 290 (also referred to as the "server storage area").

Figure 4:
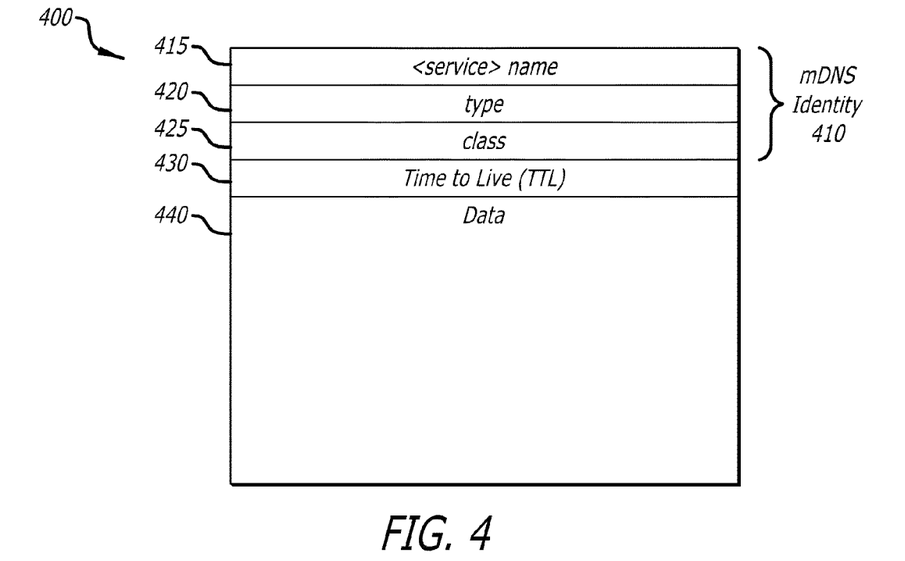
FIG. 4 is an exemplary embodiment of a data structure of the mDNS record.

As shown in FIG. 2, enhanced mDNS proxy logic 230 comprises record storage logic 270 which is adapted to process and store records based on a service name. As shown in FIG. 4, a "service name" 415 may be part of an mDNS Pointer (PTR) record that is part of a group of records advertised by a "server" mDNS device. Record storage logic 270 is adapted to maintain a list of device identifiers providing a particular enhanced mDNS service, based on the MAC addresses for these devices.

Record storage logic 270 is further adapted to classify all records to be associated with the identified server based on the identifier of the server mDNS device. Once the identifier for the server mDNS device is known, records only from that server are stored within storage unit 290 by record storage logic 270. All other non-relevant mDNS records are discarded.

Furthermore, record storage logic 270 may perform an optional second-level record storage operation in order to optimize record processing and usage of internal storage. This operation involves the classification of all records received from a server mDNS device. Record storage logic 270 is adapted to discard records received from the server mDNS device that are not associated with a configured mDNS service.

For instance, a server mDNS device may provide multiple services of which only one of these services is configured to be supported by controller 110. As illustrated above, the server mDNS device may provide services for both AirPlay and AirPrint, although only the records associated with AirPlay would be stored as the AirPlay service is enabled while the AirPrint service is disabled.

Controller 110 also may perform an optional third-level record storage operation in order to optimize record processing and usage of internal storage. This operation involves record storage logic 270 only storing specific records, from the server mDNS device, which are needed for the client mDNS devices to successfully use the configured services. There could be a few optional records, e.g. DNSEC (security), which acts as supporting records, and may not be required to fulfill the service requested. Those records directed to be unnecessary to the successful operation of a configured service is not stored to optimize internal storage.

If, upon expiration of an age-out timer set to the TTL value the server record maintenance logic 280 does not receive an mDNS Response message from the source mDNS device, the record is removed from first storage area 292. Additionally, all records associated with this source mDNS device may be removed whereby the source mDNS device is blacklisted. Of course, if an mDNS Response message is received prior to expiration of the age-out timer, the age-out timer would be reset with the new TTL value.

It is contemplated that different TTL values may be assigned to different records as different records tend to be more static in content than other records.

Device Classification and Record Storage Flow for Enhanced mDNS Protocol

Figure 3A:
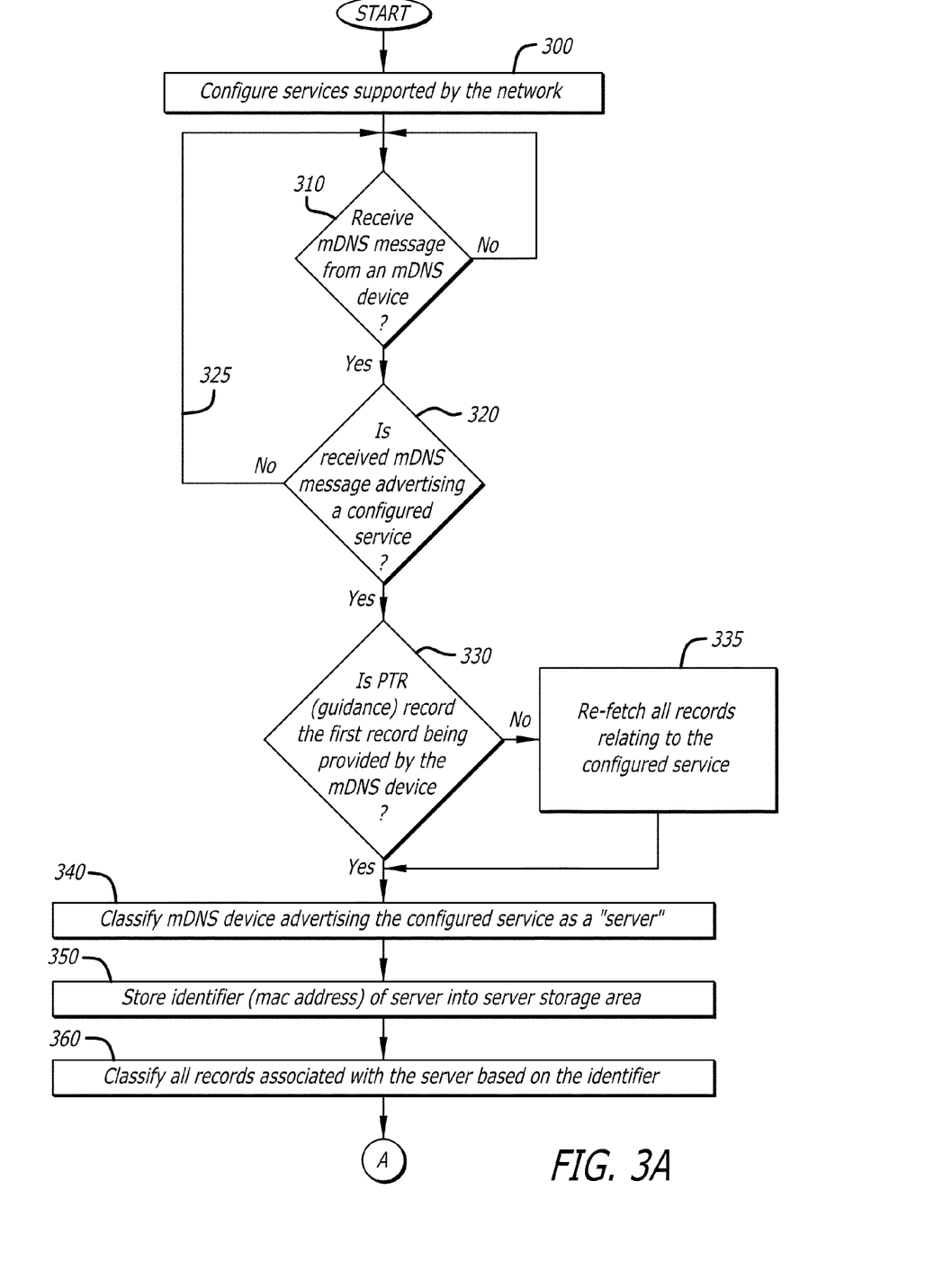
FIGS. 3A and 3B are exemplary flowcharts of mDNS device classification and optimal mDNS record storage operations performed by the controller in accordance with enhanced mDNS protocol.
Figure 3B:
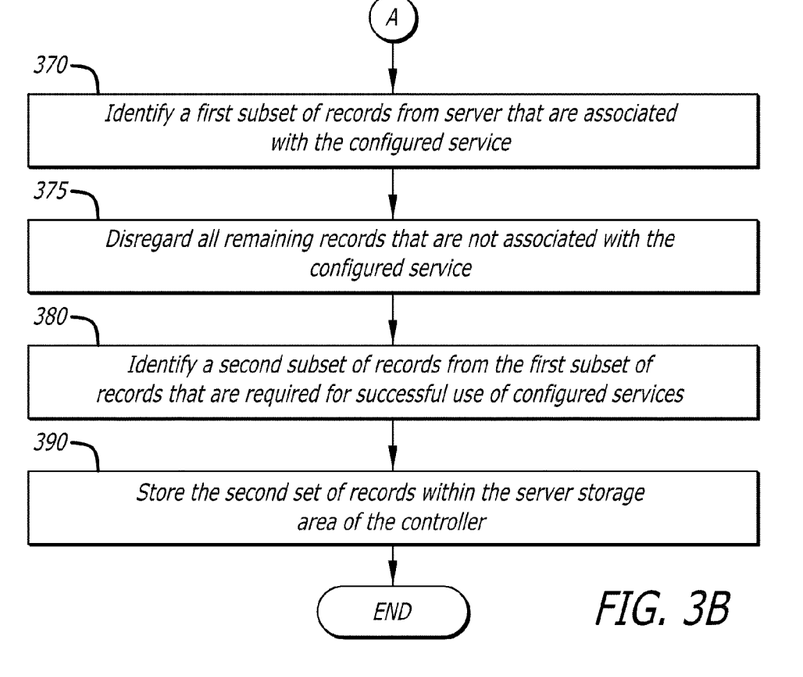

Referring to FIGS. 3A-3B, exemplary flowcharts of mDNS device classification and optimal mDNS record storage operations performed by the controller in accordance with the enhanced mDNS protocol is shown. At block 300, the enhanced mDNS proxy logic is configured to enable selected services that are to be supported by the network. These services may be configured at manufacture of the controller (pre-configured) and/or may be configured after deployment through the use of CLI commands. The CLI commands enable a user to alter the state of a selected mDNS service(s) from a first state (e.g. default state where the corresponding service is disabled) to a second state (e.g., active state where the corresponding service is enabled).

Upon receipt of an mDNS message originating from an mDNS device (block 310), a determination is made whether the mDNS message advertising at least one of the configured services (block 320). This determination may be performed by analyzing the type of mDNS message received. For instance, if an mDNS Request (REQ) message is received, it can be determined that the REQ message is not involved in the advertising of services. In this situation, the controller returns to await receipt of another mDNS message (line 325). Optionally, although not shown, the controller may classify the mDNS device transmitting the message as a client mDNS device.

Alternatively, upon receipt of an mDNS Response (RESP) message and records accompany the message, it can be determined that the mDNS RESP message is involved in the advertising of services. This causes the controller to determine whether a guidance record, namely the record used to identify a service advertised by an mDNS device such as a Pointer (PTR) record, is the first record of a series of records provided with the received mDNS message (block 330). If not, the controller re-fetches all of the records associated with the received mDNS RESP message that relates to the configured service and analyzes the records to ensure access to all of the records associated with the advertised service prior to determining which records are to be stored (block 335).

If the PTR record is the first record or the records associated with the received mDNS RESP message have been re-fetched, the controller classifies the source mDNS device that is advertising the configured service as a "server" mDNS device (block 340). As a result, an identifier of the server mDNS device, such as its MAC address, is stored within the server storage area (block 350). The storage of the MAC address of the server mDNS device is to identify which devices are classified as servers so that subsequent receipt of records from such mDNS devices, which pertain to other configured services, can be immediately stored.

Thereafter, all records associated with the server mDNS device are classified (block 360). After such classification, a first subset of records from the server mDNS device that are associated with a configured service are identified (block 370). In contrast, all remaining records that are not associated with any configured service are discarded (block 375).

Next, with respect to the first subset of records, a determination is made to identify a second subset of records that are required for successful use of one or more of the configured services (block 380). After such determination, the second subset of records are stored within the server storage area, within internal memory of the controller, for subsequent use in answering mDNS Query messages concerning services associated with these records (block 390).

Referring now to FIG. 4, an exemplary embodiment of a data structure for an mDNS record is shown. Herein, mDNS record 400 comprises an identity field 410, an age-out field 430, and a data field 440.

As shown, identity field 410 comprises three sub-fields; namely, a name sub-field 415, a type sub-field 420 and a class sub-field 425. Name sub-field 415 comprises a pointer to the name of the record while type sub-field 420 identifies the particular type of record. Various types of records may include, but are not limited or restricted to Address (A), IPv6 Address (AAAA), Pointer (PTR), Service Locator (SRV) and Text (TXT). Class sub-field 425 simply identifies the network class (e.g., Internet "IN").

Age-out field 430 comprises a value that is used to set the longevity for the record before a refresh is required. According to one embodiment of the disclosure, the value may be set by a Time-to-Live (TTL) value with address records tending to have the smallest TTL value to ensure timely detection whether or not the associated record is available on the sourced mDNS device.

The contents of data field 440 depend on the particular type of mDNS record. For instance, data field 440 for an "A" type record and an "AAAA" include 32-bit and 128-bit IP addresses, respectively. Data field 440 for PTR-type records include a pointer to a name. Pseudo code illustrating a composition of a record is set forth below in Table 1.

TABLE 1

```
char       *name;
uint16_t type;
uint16_t class;
uint32_t ttl;      /* TTL of this Resource Record */
union {
    struct {
        uint16_t priority;
        uint16_t weight;
        uint16_t port;
        char *name;
    } srv;              /* SRV records */
    struct {
        char *name;
    } ptr, ns, cname;   /* PTR records */
    struct {
        char *string;
    } txt;              /* TXT records */
    struct {
        uint32_t address;
    } a;                /* A records */
    struct {
        uint8_t address[16];
    } aaaa;             /* AAAA records */
} data; /* Resource Record data */
```

Figure 5:
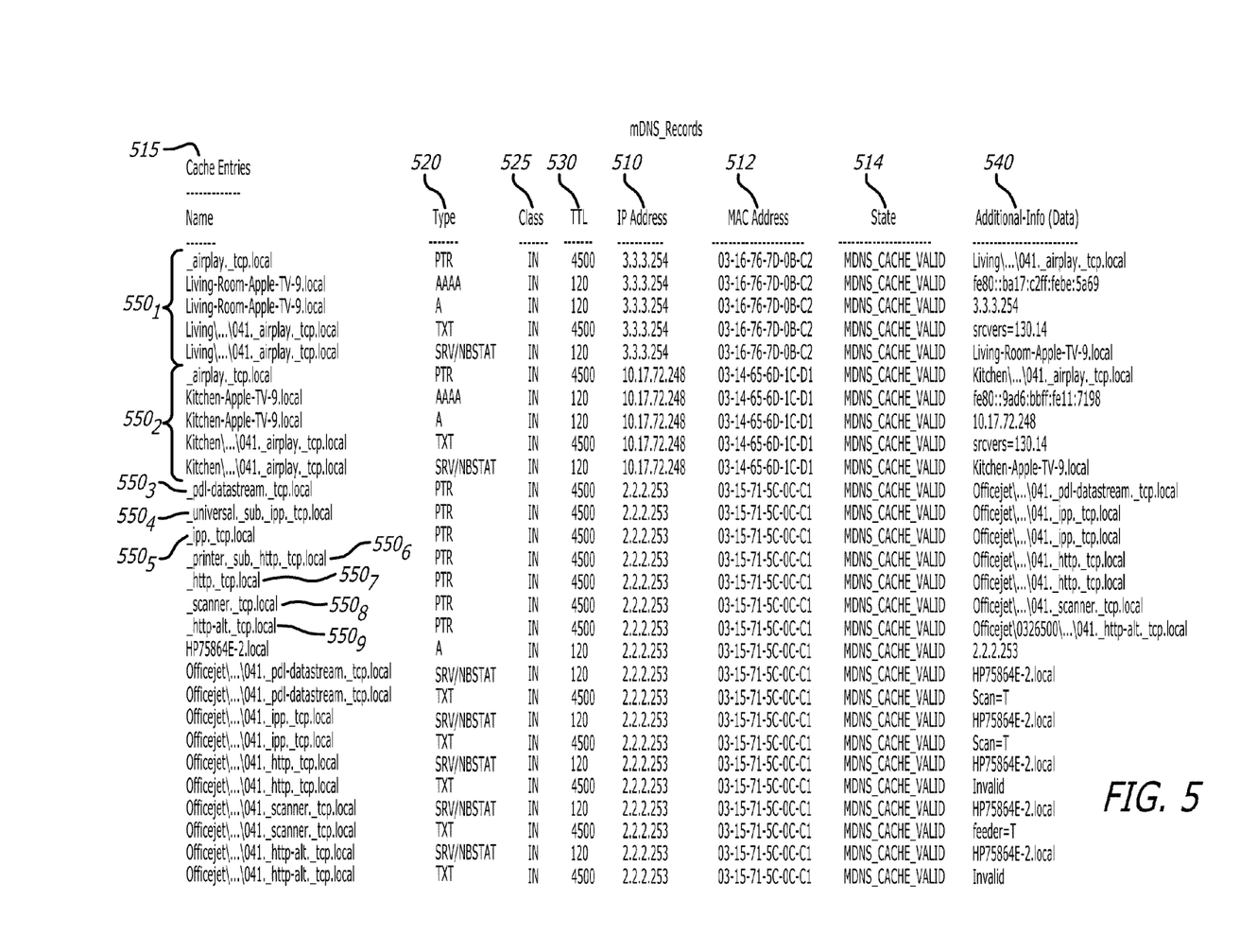
FIG. 5 is an exemplary embodiment of a record list maintained by the controller of FIG. 2.

Referring to FIG. 5, an exemplary embodiment of a record list 500 maintained by controller 110 within first storage area 292 of FIG. 2. Record list 500 comprises one or more record entries $550_1$-$550_R$ (R≥1, R=9), where each record entry $550_1$-$550_R$ comprises information extracted from messaging transmitted from the server mDNS device and collected by the controller.

As an illustrative example, as shown, record entry $550_1$ includes (1) address information extracted from an mDNS Response message advertising a particular service supported the enhanced mDNS proxy logic (e.g., IP address 510, MAC address 512, state 514 (e.g., whether valid or invalid due to blacklisting) and (2) information (e.g., name 515, type 520, class 525, TTL value 530 and/or and data 540) extracted from a record corresponding to one of the configured services.

Figure 6:
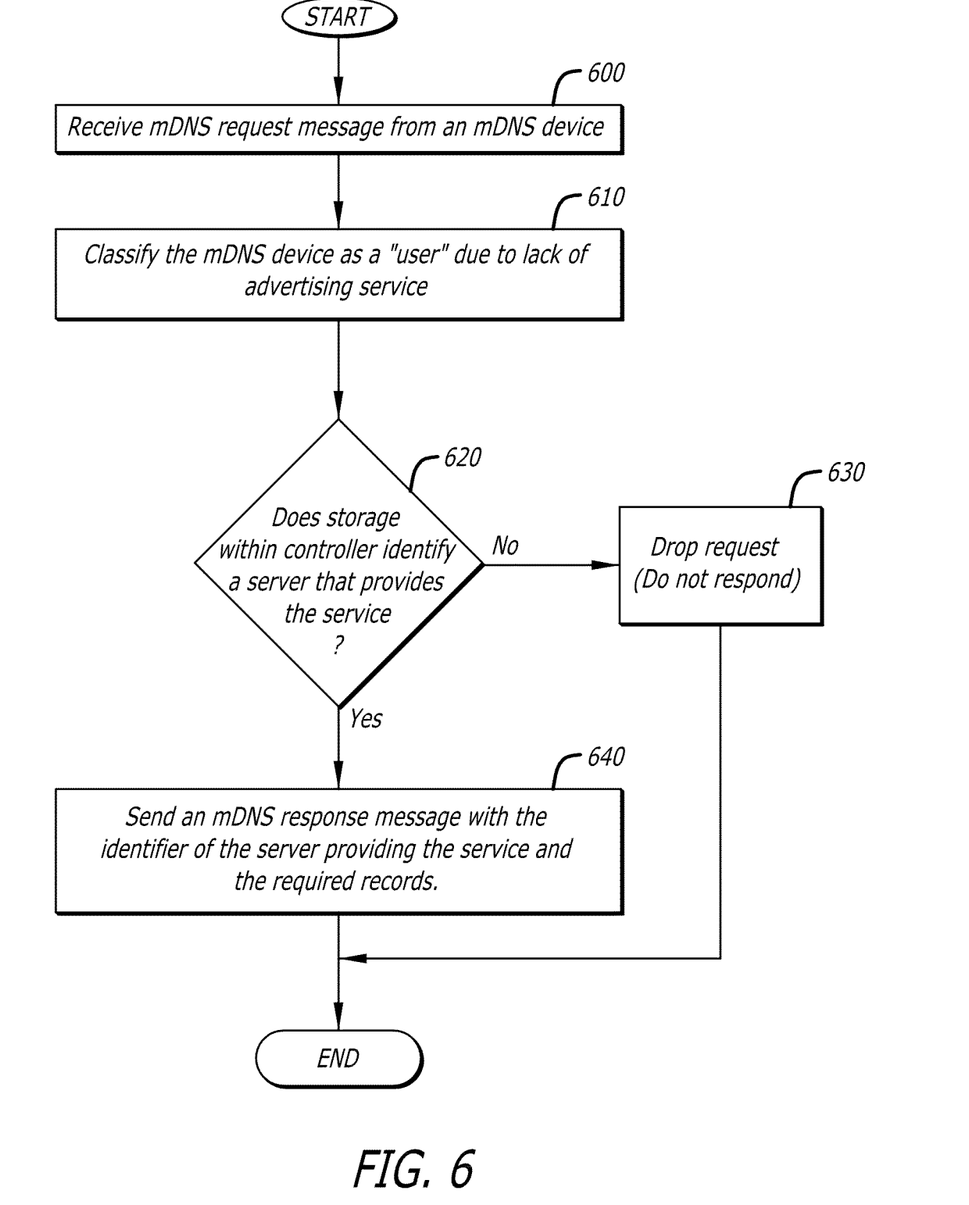
FIG. 6 is an exemplary flowchart of the operations performed by the controller of FIG. 2 for responding to an mDNS Request message for services.

Referring now to FIG. 6, an exemplary flowchart of the operations performed of the controller of FIG. 2 for responding to an mDNS Request message is shown. The mDNS Request message is used by an mDNS device to request records associated with a particular service and mDNS device offering that service.

Initially, an mDNS Request message is received from an mDNS device (block 600). Upon receipt of this message, the controller classifies the mDNS device as a "client" due to the fact that the mDNS Request message has no involvement in the advertisement of services (block 610). Thereafter, a determination is made as to whether a storage entry within the server storage area of internal storage identifies the server mDNS device that provides such services (block 620). If not, the mDNS Request message is dropped (block 630). Otherwise, the controller sends an mDNS Response message that includes the required records to perform such services and/or an identifier of the server providing the requested service (block 640).

Illustrative Message Handling by Enhanced mDNS Proxy Logic

Figure 7:
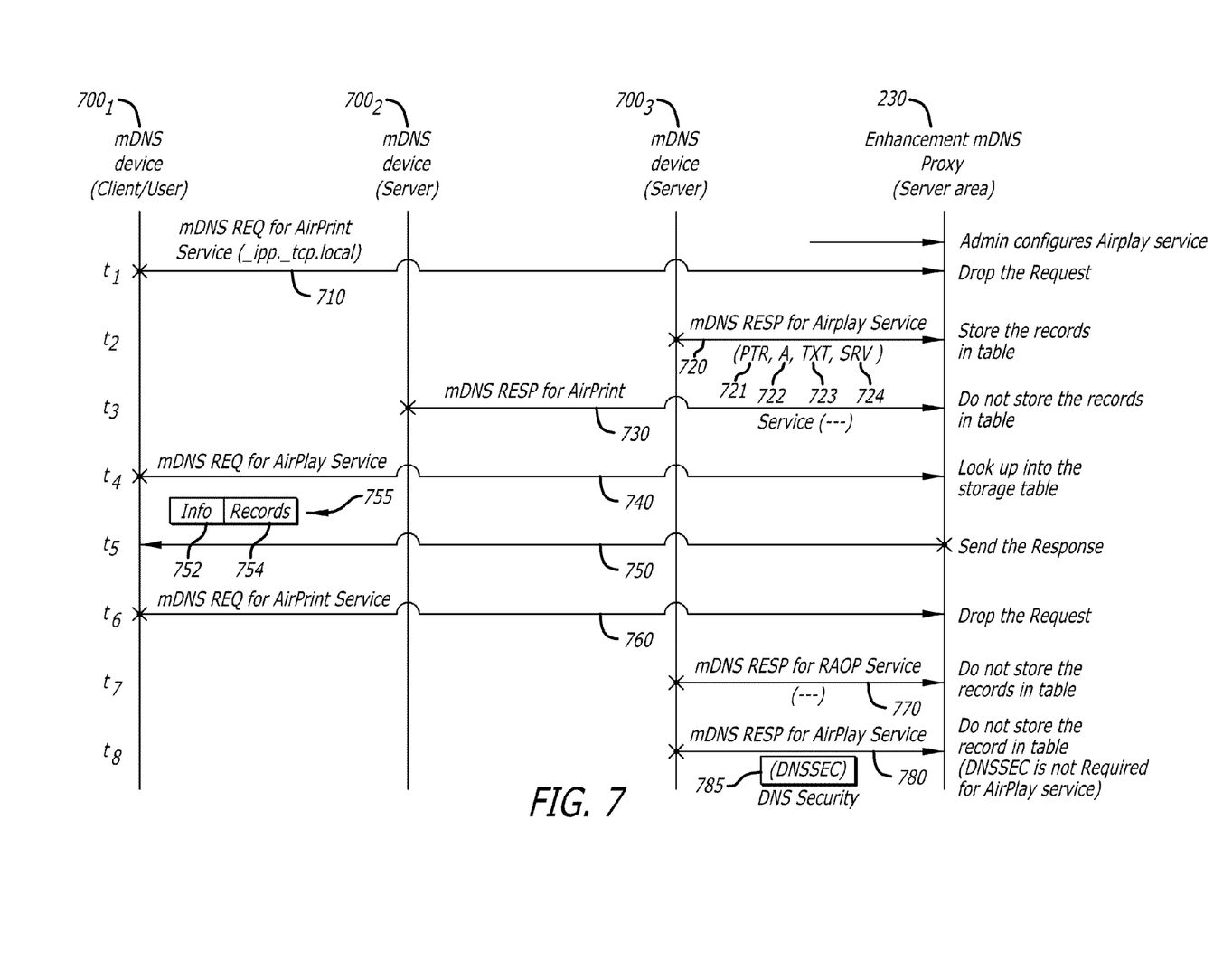
FIG. 7 is an exemplary embodiment of a message exchange diagram providing illustrative signaling between the controller, a client mDNS device and server mDNS devices.

FIG. 7 is an illustrative example of message handling by enhanced mDNS proxy logic 230 of the controller in communications a plurality of mDNS devices $700_1$-$700_3$. For this illustration, first mDNS device $700_1$ constitutes a "client" mDNS device while both second mDNS device $700_2$ and third mDNS device $700_3$ constitute "server" mDNS devices.

As previously described, enhanced mDNS proxy logic 230 is initially configured to support one or more services. These services may be pre-configured or configured using CLI commands. Herein, enhanced mDNS proxy logic 230 is initially configured to support a single service (AirPlay).

After initialization, at time t1, first mDNS device $700_1$ issues an mDNS Request message 710 for AirPrint service (_ipp._tcp.local). Upon receipt of mDNS Request message 710, enhanced mDNS proxy logic 230 ignores the request as it is directed to a service (AirPrint) that is not currently supported.

At time t2, third mDNS device $700_3$ issues an mDNS Response message 720 which advertising AirPlay services. In particular, mDNS Response message 720 includes a series of records, including Pointer (PTR) record 721, an IPv4 address (A) record 722, a Text (TXT) record 723, a Service Locator (SRV) record 724, and the like. As these records are deemed to be necessary to the successful operation of the AirPlay service, these records 721-724 are stored in the server storage area within storage memory of the controller.

At time t3, second mDNS device $700_2$ issues an mDNS Response message 730 advertising a service (e.g., AirPrint). Upon receipt of mDNS Response message 730, enhanced mDNS proxy logic 230 ignores the message as it is directed to a service (AirPrint) that is not currently supported by enhanced mDNS proxy logic 230.

At time t4, first mDNS device $700_1$ issues an mDNS Request message 740 requesting information associated with AirPlay services. In response, at time t5, enhanced mDNS proxy logic 230 returns information 752 associated with third mDNS device $700_3$ (e.g., MAC address) that provides such services along with records 754 needed by first mDNS device $700_1$ to perform AirPlay services.

At time t6, first mDNS device $700_1$ issues another mDNS Request message 760 for AirPrint services. Upon receipt of mDNS Request message 760, enhanced mDNS proxy logic 230 again ignores the request as it is directed to a service (AirPrint) that is not supported by enhanced mDNS proxy logic 230.

At time t7, third mDNS device $700_3$ issues an mDNS Response message 770 advertising Remote Audio Output Protocol (RAOP) services. Upon receipt of mDNS Response message 770, enhanced mDNS proxy logic 230 ignores the message as it is directed to a service (RAOP) that is not currently supported by enhanced mDNS proxy logic 230.

At time t8, third mDNS device $700_3$ issues an mDNS Response message 780 which advertising AirPlay services. In particular, mDNS Response message 780 includes a Domain Name System Security Extensions (DNSSEC) record 785 which identifies a particular security scheme utilized by third mDNS device $700_3$. As this record is not necessary for the successful operation of the AirPlay service, DNSSEC record 785 is not stored in the server storage area within the storage memory of the controller. Rather, DNSSEC record 785 is discarded.

It is to be understood that the above description is intended to be illustrative, and not restrictive. Many other embodiments will be apparent to those of skill in the art upon reading and understanding the above description. For instance, multiple controllers may be deployed where one of the controllers is responsible for controlling the enhanced mDNS protocol while another controller is responsible for wireless local area network operations. The scope of the invention should, therefore, be determined with reference to the appended claims, along with the full scope of equivalents to which such claims are entitled.

What is claimed is:

1. A method comprising:
   detecting, by a first digital device, at least one message having a format in accordance with a multicast Domain Name System (mDNS) protocol from a second digital device;
   classifying, by the first digital device, the second digital device as a first device type when the at least one message advertises a network service provided by the second digital device to other digital devices;
   classifying, by the first digital device, the second digital device as a second device type when the at least one message requests network services from a digital device classified as the first device type, wherein the requested network services are to be used by the second digital device; and
   storing, by the first digital device, information for the advertised network service only when the second digital device is classified as the second device type,
   wherein storing the information comprises identifying a first subset of records and a second subset of records from information within the at least one message, wherein:
      the first subset of records is associated with the advertised network service;
      the advertised network service is a first network service or a second network service; and
      the second subset of records is associated with an advertised network service other than the first network service and the second network service.

2. The method of claim 1, wherein the detecting of the at least one message having the format in accordance with the mDNS protocol is conducted by a controller.

3. The method of claim 1, wherein the detecting of the at least one message having the format in accordance with the mDNS protocol is conducted by an access point.

4. The method of claim 1, wherein prior to classifying the second digital device as the first device type, the method further comprises
   determining when the at least one message is advertising at least one network service supported by a network and classifying the second digital device as the first device type in response to determining that the at least one network service is supported by the network; and
   determining a first record, being a part of the information contained in the at least one message, is a specific type of record.

5. The method of claim 4, wherein the first record is a Pointer (PTR) record.

6. The method of claim 5 further comprises fetching all records contained in the information associated with the at least one message when the PTR record is a record other than the first record of the information.

7. The method of claim 1, wherein the storing of the information comprises storing an identifier for the second digital device and classifying all records associated with the second digital device based on the identifier.

8. The method of claim 7, wherein a record comprises information identifying (i) a name of the record, (ii) a record type, (iii) a value that controls longevity of the record in an active state, and (iv) addressing information.

9. The method of claim 1, wherein the first digital device is communicatively coupled to the second digital device over a network that supports a first network service and a second network service.

10. The method of claim 1, wherein the first digital device is one of a computer or a server, and wherein a device of the first device type provides a network service to be used by a device of the second device type.

11. The method of claim 1, further comprising
storing the first subset of records; and
disregarding the second subset of record.

12. The method of claim 1, further comprising:
identifying a third subset of records from the information within the at least one message, the third subset of records being identified as records required to perform one of a first network service or a second network service; and
storing only the third subset of records.

13. A digital device of a first device type to support one or more network services, the digital device comprising:
processing circuitry;
a memory coupled to the processing circuitry, the memory comprises logic that, when executed by the processing circuit, is configured to (i) detect a message from a second digital device, wherein the message has a format in accordance with a multicase Domain Name System (mDNS) protocol (ii) in response to the second digital device advertising one or more network services in the message, classify the second digital device as a first device type (iii) in response to the second digital device requesting in the message one or more network services for use by the second digital device, classify the second digital device as a second device type, and (iv) store information only directed to the one or more network services advertised by the second digital device of the first device type; and
the logic to:
identify a first subset of records and a second subset of records from the message, the first subset of records associated with a first network service of the one or more network devices and the second subset of records associated with a second network service different than the first network service.

14. The digital device of claim 13, wherein the logic, when executed by the processing circuitry, refrains from storing information directed to network services other than the one or more network services advertised by the second digital device when classified as the first device type.

15. The digital device of claim 13 being a controller.

16. The digital device of claim 13 being an access point.

17. The digital device of claim 13, wherein a device of the first digital device type provides a network service to be used by a device of the second device type.

18. The digital device of claim 13, wherein the logic classifies the second digital device as either the first device type or the second device type further in response to initialization or restarting of the logic.

19. The digital device of claim 13, wherein logic classifies the second digital device as either the first device type or the second device type further in response to detecting that the second digital device or services referenced in the message have not been previously detected by the logic.

20. The digital device of claim 13, wherein an mDNS record comprises information identifying (i) a name of the record, (ii) a record type, (iii) a value that controls longevity of the record in an active state, and (iv) addressing information.

21. The digital device of claim 20, wherein the logic is further configured to store the first subset of records, and disregard the second subset of records.

22. The digital device of claim 20, wherein the logic is further configured to identify a third subset of records from the message, the third subset of records being identified as records required to perform the first network service, and store only the third subset of records.

23. A non-transitory computer-readable storage media that includes software that, when executed by processing circuitry in the first digital device of a first device type, causes the first digital device to:
detect a message having a format in accordance with a multicast Domain Name System (mDNS) protocol from a second digital device;
classify the second digital device as a first device type when the message advertises a network service to be provided by the second digital device to other digital devices;
classify the second digital device as a second device type when the message requests network services from a digital device classified as the first digital device type, wherein the requested network services are to be used by the second digital device;
store information for the advertised network service only when the second digital device is classified as the first device type;
and identify a first subset of records and a second subset of records from the message, the first subset of records associated with a first network service of the one or more network devices and the second subset of records associated with a second network service different than the first network service.

* * * * *